Sept. 27, 1960  J. I. HOOVER ET AL  2,954,473
CERENKOV RADIATION FISSION PRODUCT DETECTOR
Filed May 9, 1957
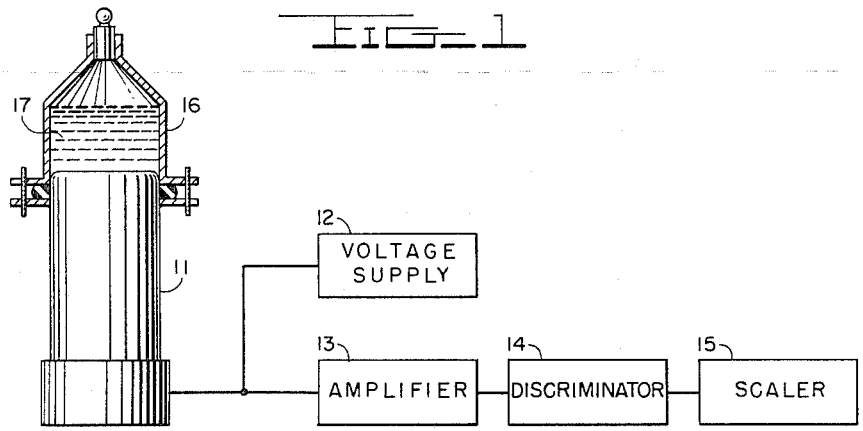
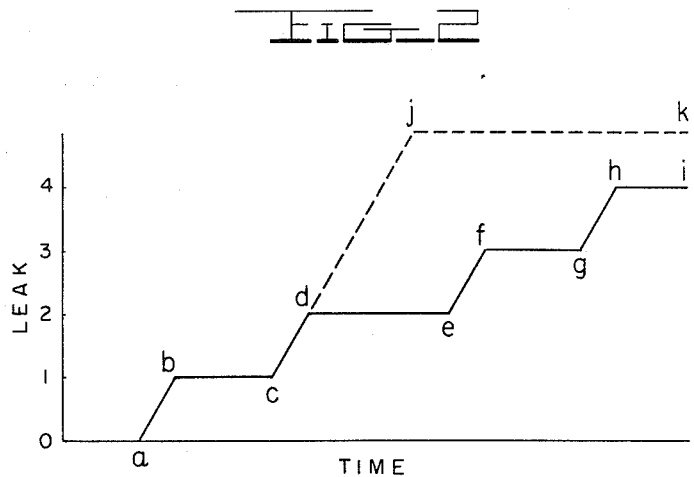
INVENTORS
CLIFFORD M. GORDON
JOHN I. HOOVER
BY W. R. Mattox
Richard C. Reed
ATTORNEYS

2,954,473

CERENKOV RADIATION FISSION PRODUCT DETECTOR

John I. Hoover, Springfield, Md. (5313 Briley Place, Washington 16, D.C.), and Clifford M. Gordon, Oxon Hill, Md. (5107 Dumfries St., Washington 21, D.C.)

Filed May 9, 1957, Ser. No. 658,210

3 Claims. (Cl. 250—71.5)

(Granted under Title 35, U.S. Code (1952), sec. 266)

The invention described herein may be manufactured and used by or for the Government of the United States of America for governmental purposes without the payment of any royalties thereon or therefor.

The present invention relates to Cerenkov detectors and more particularly to a method of measuring the presence of fission product isotope contaminants in the liquid coolant of a nuclear reactor.

Radiation detection by the principle of detecting Cerenkov radiation by prior art devices has been carried out by photographic processes and focusing and nonfocusing devices. These are well known in the art and a more detailed description may be found in a published article by J. Marshall in Annual Review of Nuclear Science, vol. 4, p. 141, J.G. Beckerley, ed. (1954).

Heretofore Cerenkov detectors of one sort or another as above referred to require various types of auxiliary equipment such as optical lens, mirrors, etc., or radiators, of various kinds associated with a photomultiplier tube to study the phenomena associated with high energy accelerators. The term radiator denotes the part of the detector in which the Cerenkov radiation is produced. The particles to be measured or detected are incident on the radiator and on penetrating the radiator must have a long enough range in the radiator and a high velocity to produce a usable number of photons at the photocathode of the photomultiplier used to liberate electrons. The particles passing through the radiator at a velocity greater than light in the same medium produce Cerenkov radiation which is detected by the photomultiplier tube.

Cerenkov radiation is considered to be an electromagnetic shock wave produced when a charged particle traverses a dielectric medium at a velocity greater than that of light in the same medium. This is a well known phenomenon in water used either as a moderator or a shield around a nuclear reactor.

Cerenkov detectors referred to above are used for detection of different types of particles from a source or that which passes through air such as cosmic rays. Prior art methods for detecting fission product contaminants of a nuclear reactor heretofore have been carried out by taking a sample of the coolant liquid, chemically separating the isotopes by an ion exchange column with subsequent gamma radiation counting or by boiling the water away, and then taking a count of the fission isotopes by Beta counting with a scintillation counter and electronic energy selection; or by delayed neutron detection, or where long half-lives of isotopes are involved by conventional radio-chemical separation. These methods often require considerable time, special handling of the contaminated liquid, the ion exchanger or residue from chemically separated solution. During some of the above processes contaminants having a very short half-life would not be detected because they would have expended their radio active emission by the time the count was made.

The present invention overcomes the disadvantages of the prior art wherein a count of fission product contaminants in a liquid is taken directly from the liquid itself without any physical or chemical treatment.

It is therefore an object of the present invention to directly detect fission product contaminants in a liquid without any physical or chemical treatment of the liquid.

Another object is to detect fission product contaminants in a liquid in which the contaminants may have short half-lives.

Still another object is detect fission product contaminants in a liquid by use of Cerenkov detector.

Yet another object is to detect fission contaminants in a liquid in the presence of considerable amounts of isotopes emitting lower energy Beta radiation.

Another object is to detect fission product contaminants in a liquid in high fields of gamma radiation.

A further object is to enable constant detection for leakage of fission products into a reactor liquid cooling system.

Other and more specific objects of this invention will become apparent upon a more careful consideration of the following detailed description when taken together with the accompanying drawings, in which;

Fig. 1 is a block diagram illustrating the apparatus used for detecting and identifying fission products in a liquid; and Fig. 2 is a graph illustrating the detection of fission product contaminants according to the contaminant leakage into a coolant liquid.

In accordance with the present invention, detection of high energy electrons from a few selected fission product contaminants in a liquid is made possible by the use of a Cerenkov radiation detector. The liquid which is to be investigated for fission product contaminants is exposed directly to the window of a photomultiplier tube. The fission product contaminants in the liquid provide Cerenkov radiation as a source of photons which strike the photocathode of the photomultiplier to produce electrons. The electrons liberated by the photons striking the photocathode produce pulses from the tube which determine the amount of contamination in the liquid.

Now referring to the drawings, there is illustrated in Fig. 1 a block diagram which diagrammatically illustrates a detecting system according to this invention. The system includes a 6292 DuMont photomultiplier tube 11, a suitable voltage source 12, a pulse amplifier 13, for example, Atomic Instrument Co. Model 218, including a discriminator 14, a scaler 15, for example, Atomic Instrument Co. Model 1060, or ratemeter, and a means for exposing the photomultiplier to a liquid for testing purposes. In the illustrated system the photomultiplier 11 is shown with a suitable container 16 suitably positioned over the end thereof and within which a liquid sample 17 is placed. If the liquid contains fission product contaminants such as isotopes emitting Beta radiation of different energies, pulses produced by the photomultiplier will be in proportion to the Cerenkov radiation emitted by electrons from the isotopes.

In operation of the device, the discriminator is set so that only pulses produced by high energy electrons from fission product isotopes with energies of about 5 mev. to about 8 mev. are passed. This separates the low energy electrons from the high energy electrons which enables one to measure fission product contaminants in the presence of considerable amounts of neutron activated isotopes and fission produced isotopes emitting lower energy electrons. Since different isotopes emit electrons of different energies the discriminator can be set to detect only those desired isotopes. The ability to distinguish electron energies is enhanced in the present invention by utilizing the non-linear characteristics of the Cerenkov radiation from electrons. The intensity of radiation is reduced inherently for the lower energy electrons and no radiation at all is produced by electrons of energy less than 260 kilovolts. It is clear that this is a distinct advantage over linear devices such as scintillation counters, for biasing out large, low energy, background and enhancing the detection of the higher energy fission product beta radiation. The photomultiplier tube can be placed with the window inserted into the path of the coolant liquid for constant detection of possible contaminant leaks or in cases where a pool of water is used for the liquid coolant, a sample of the water can be taken and placed on top of the photomultiplier tube within the container 16 as shown in the drawings. Fission product contaminants in the water will produce high energy electrons which pass through the coolant at a velocity greater than that of light in the coolant. This emits light (Cerenkov radiation) which is viewed by the photomultiplier and the pulses produced by the photomultiplier are proportional to the Cerenkov radiation. The pulses are fed from the photo-tube to an amplifier where the pulse is amplified. The amplifier feeds the pulse signal into the discriminator where depending on the energy of the pulses, the pulse will be passed to the scaler or blocked by the discriminator. Only those pulses produced by high energy electrons according to the setting of the discriminator will be passed into the scaler where the counting rate is taken as a function of time to determine the amount of contamination in the coolant.

The system of the present invention utilizes characteristics of Cerenkov radiation to enable one to conveniently detect short lived fission isotopes, thus greatly improving the response time of the detector and its ability to detect successive fission product leaks. Fig. 2 illustrates graphically the count rate per leak with respect to time. For instance, where the window of the photomultiplier tube is constantly exposed to the coolant, detection of a leak can be made as soon as the coolant has become contaminated. Assuming that a leak takes place, fission isotopes will be released into the coolant and when the coolant passes the photomultiplier tube, the tube will view Cerenkov radiation produced by the high energy electrons of the fission isotopes. Accordingly, pulses will be shown on the scaler and the line on the graph from $a$ to $b$ will represent the indication of a leak and its magnitude. As long as the power level and the leak is constant the detector will indicate the same number of counts which would be indicated by the straight line of the graph from $b$ to $c$. As long as there is no change in the power level or the leak rate, the line would continue in a line along $b—c$. But, suppose a second leak occurs to release more fission isotopes to produce a greater amount of Cerenkov radiation, then the count rate would rise as shown by the graph from $c$ to $d$. Again, as long as the power level and the leak rate of each leak is constant, the count would be constant and indicated by the straight line of the graph from $d$ to $e$. Each successive leak would be indicated by a higher count rate and be shown by the graph from $e$ to $f$, etc. Now suppose we had only one leak which is indicated by the line $a$, $b$, $c$, and suppose the leak were to get larger than it originally was, this will at first appear as a second leak to give a greater count say from $e$ to $d$, the count rate would not stabilize at $d$ but continue to a higher count rate illustrated by the dotted line from $d$, and would continue to rise until the leak became constant at $j$, then the count rate would again become constant and would follow the line $j$ to $k$ to indicate the amount of contaminants in the coolant.

A Cerenkov detector according to this invention has a minimum of auxiliary equipment, it has faster response, instant reading and is relatively insensitive to gamma radiation. High energy electrons emitted by fission isotopes having very short half-lives can be detected unambiguously whereas they would not be detected thus by known methods used in the prior art. For instance, it is possible in certain instances to detect the following isotopes which are shown with their corresponding half-lives.

| Isotope | Half-life | Isotope | Half-Life |
| --- | --- | --- | --- |
| $Br^{87}$ | 55.6 sec. | $Y^{94}$ | 16.5 min. |
| $I^{136}$ | 86.0 sec. | | |
| $Rb^{90}$ | 2.7 min. | $Kr^{88} \rightarrow Rb^{88}$ | 2.77 hrs. |

The above isotopes have maximum electron energies from about 8.0 mev. for $Br^{87}$ to about 5.3 mev. for $Kr^{88} \rightarrow Rb^{88}$ which is sufficient to be measured conveniently by the present invention. For the most rapid response time one selects by energy discrimination the isotopes $Br^{87}$ and $I^{136}$. Whereas, if maximum sensitivity is desired all the above isotopes may be counted simultaneously. The only requirements for measurement of the various isotopes are that the transit time between the leak and detector be short with respect to the lives of the isotopes involved and that the isotopes to be detected emit Beta radiation of higher energy than non-fission product radio-active contamination.

Obviously many modifications and variations of the present invention are possible in the light of the above teachings. It is therefore to be understood that within the scope of the appended claims the invention may be practiced otherwise than as specifically described.

What is claimed is:

1. The method of detecting fission product contaminants in the liquid coolant of a nuclear reactor which comprises obtaining a sample of the liquid coolant, placing said sample in a container positioned over the window end of a photomultiplier tube thereby exposing the photocathode of said photomultiplier tube to said sample, and measuring the pulses of said photomultiplier tube resulting from Cerenkov radiation produced by high energy electrons emitted by contaminants in said sample.

2. The method of detecting fission product leaks in a nuclear reactor which comprises positioning a photomultiplier tube in the liquid coolant system of said reactor with the window end thereof directly exposed to the liquid coolant whereby the photocathode of said photomultiplier tube is excited by photons resulting from Cerenkov radiation produced by fast energy electrons emitted by contaminants in said liquid, and measuring the pulses produced by said photomultiplier tube due to said Cerenkov radiation.

3. The method of detecting fission isotopes in a liquid coolant of a nuclear reactor which comprises setting a discriminator for selecting energy pulses of desired electron intensities produced by a photomultiplier tube, measuring Cerenkov radiation produced by high energy electrons emitted by contaminants in said liquid by exposing said photomultiplier tube to the liquid coolant to be investigated, amplifying the pulses from said photomultiplier tube, discriminating the pulse from said photomultiplier tube and measuring the discriminated pulse with a scaler to determine the amount of fission isotopes in said liquid.

References Cited in the file of this patent

UNITED STATES PATENTS

| | | |
| --- | --- | --- |
| 2,739,242 | Armistead | Mar. 20, 1956 |
| 2,750,513 | Robinson et al. | June 12, 1956 |
| 2,750,514 | Armistead | June 12, 1956 |
| 2,758,217 | Scherbatskoy | Aug. 7, 1956 |
| 2,759,107 | Armistead et al. | Aug. 14, 1956 |
| 2,768,307 | Tirico | Oct. 23, 1956 |
| 2,821,633 | Friedman | Jan. 28, 1958 |

OTHER REFERENCES

UCRL 3490 "Lead Glass Cerenkov Radiation Photon Spectrometer," University of California, June 14, 1957.

Kantz et al.: "Large Scintillation, Cerenkov Counters for High Energies," Nucleonics V. 12 No. 3, March, 1954, pp. 36–43.